(12) United States Patent
Hunzinger

(10) Patent No.: US 9,094,083 B2
(45) Date of Patent: Jul. 28, 2015

(54) SYSTEMS, APPARATUS AND METHODS TO FACILITATE EFFICIENT REPEATER USAGE

(75) Inventor: Jason Frank Hunzinger, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 274 days.

(21) Appl. No.: 13/102,862

(22) Filed: May 6, 2011

(65) Prior Publication Data
US 2012/0113834 A1 May 10, 2012

Related U.S. Application Data

(60) Provisional application No. 61/345,850, filed on May 18, 2010.

(51) Int. Cl.
*H04J 1/16* (2006.01)
*H04B 7/155* (2006.01)

(52) U.S. Cl.
CPC ................... *H04B 7/15535* (2013.01)

(58) Field of Classification Search
CPC . H04W 24/00; H04W 52/143; H04B 7/15535
USPC ......... 370/252, 328, 338; 455/13.4, 114–116, 455/194.2, 340, 341, 355
See application file for complete search history.

(56) References Cited

U.S. PATENT DOCUMENTS

| 6,532,357 | B1* | 3/2003 | Ichikawa ...................... 455/126 |
| 7,233,771 | B2 | 6/2007 | Proctor, Jr. et al. |
| 7,555,261 | B2 | 6/2009 | O'Neill |
| 7,715,866 | B2* | 5/2010 | Seppinen et al. ............. 455/522 |
| 2002/0123306 | A1 | 9/2002 | Masoian |
| 2004/0001464 | A1 | 1/2004 | Adkins et al. |
| 2004/0156097 | A1 | 8/2004 | Roper et al. |
| 2004/0184411 | A1* | 9/2004 | Tamura ......................... 370/252 |
| 2006/0262871 | A1* | 11/2006 | Cho et al. ...................... 375/260 |
| 2008/0037413 | A1* | 2/2008 | Gu et al. ........................ 370/210 |
| 2008/0076437 | A1 | 3/2008 | Wilson et al. |
| 2009/0080349 | A1 | 3/2009 | Rofougaran |
| 2009/0268678 | A1 | 10/2009 | Huo et al. |
| 2010/0188153 | A1 | 7/2010 | Woo et al. |
| 2011/0230150 | A1* | 9/2011 | Rofougaran ............... 455/127.1 |

OTHER PUBLICATIONS

Li et al., "A Si LDMOS Class AB Power Amplifier for UMTS LTE Base Stations," German Microwave Conference 2010, IMA, 978-3-9812-6681-8, pp. 272-275.
International Search Report and Written Opinion—PCT/US2011/037035, ISA/EPO—Jul. 25, 2011.
Taiwan Search Report—TW100117446—TIPO—Jan. 28, 2014.

* cited by examiner

*Primary Examiner* — Kan Yuen
(74) *Attorney, Agent, or Firm* — Thien T. Nguyen

(57) ABSTRACT

In accordance with aspects of the disclosure, a method, apparatus, and computer program product are provided for wireless communication. The method, apparatus, and computer program product may be provided for detecting a change in power of received signals and adjusting amplification of the received signals based on the detected change in power prior to transmitting the signals.

44 Claims, 10 Drawing Sheets

SYSTEMS, APPARATUS AND METHODS TO FACILITATE EFFICIENT REPEATER USAGE

CROSS-REFERENCE TO RELATED APPLICATION(S)

This application claims priority to and benefit of U.S. Provisional Patent Application Ser. No. 61/345,850, entitled "Methods and Apparatus for Facilitating Efficient Repeater Usage," filed on May 18, 2010, which is incorporated by reference herein in its entirety.

BACKGROUND

1. Field

The present disclosure relates generally to communication systems, and more particularly, to systems and methods for facilitating efficient repeater use in a wireless communications system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit, power). Examples of such multiple-access technologies include code division multiple access (CDMA) systems, time division multiple access (TDMA) systems, frequency multiple access (FDMA) systems, orthogonal, frequency division multiple access (OFDMA) systems single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with aspects of the disclosure, a method to facilitate wireless communication comprises detecting a change in power of received signals and adjusting amplification of the received signals based on the detected change in power prior to transmitting the signals.

In accordance with aspects of the disclosure, an apparatus for wireless communication comprises a processing system configured to detect a change in power of received signals and adjust amplification of the received signals based on the detected change in power prior to transmitting the signals.

In accordance with aspects of the disclosure, an apparatus for wireless communication comprises means for detecting a change in power of received signals and means for adjusting amplification of the received signals based on the detected change in power prior to transmitting the signals.

In accordance with aspects of the disclosure, a computer program product for wireless communication comprises a computer-readable medium comprising codes executable to cause an apparatus to detect a change in power of received signals and adjust amplification of the received signals based on the detected change in power prior to transmitting the signals.

DETAILED DESCRIPTION

Figure 1A:
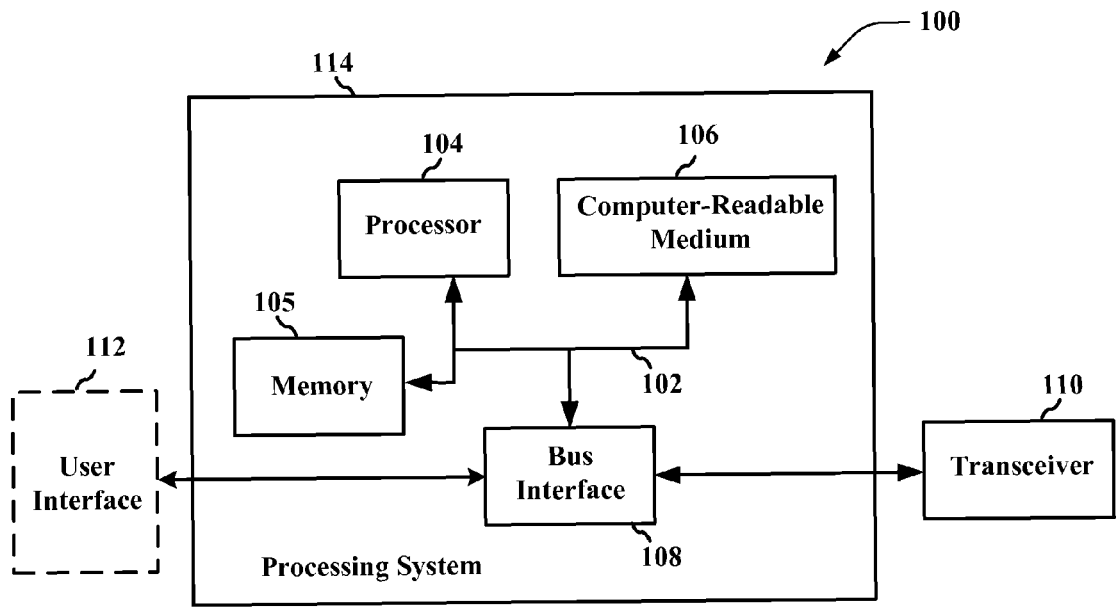
FIG. 1A is a conceptual diagram illustrating an example of a hardware implementation for an apparatus employing a processing system, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated, logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software. The computer-readable medium may be resident in the processing system, external to the processing system, or distributed across multiple entities including the processing system. Computer-readable medium may be embodied in a computer-program product. Computer-readable medium does not refer to a transitory propagating signal. By way of example, a computer-program product may include a computer-readable medium in packaging materials. Those skilled the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

FIG. 1A is a conceptual diagram illustrating an example of a hardware implementation for an apparatus 100 employing a processing system 114 having a memory 105. In an example, the processing system 114 may comprise an analog device, a digital device, or an analog/digital device and be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110, which may be referred to as a gain device. The transceiver 110 provides a means for communicating with various other apparatus over a transmission medium. In an implementation, depending upon the nature of the apparatus 100, a user interface, 121 (e.g., keypad, display, speaker, microphone, joystick) may be optionally provided.

The processor 104 is responsible for managing the bus 102 and general processing, including the execution of software stored on the computer-readable medium 106. The software, when executed by the processor 104, causes the processing system 114 to perform the various functions described herein for any particular apparatus. The computer-readable medium 106 may also be used for storing data that is manipulated by the processor 104 when executing software. The processor 104 may also be responsible for controlling the transceiver 110 to provide analog and/or digital processing (including echo cancellation, signal filtering, received power determination, etc.) and provide gain control for received and/or transmitted signals.

In accordance with aspects of the disclosure, the apparatus 100 may be configured to operate as a repeater and/or a relay, and the processing system 114 may be configured to perform operations relating to a repeater and/or relay. As such, the apparatus 100 comprising the processing system 114 may be configured to implement aspects of the disclosure as provided herein.

Figure 1B:
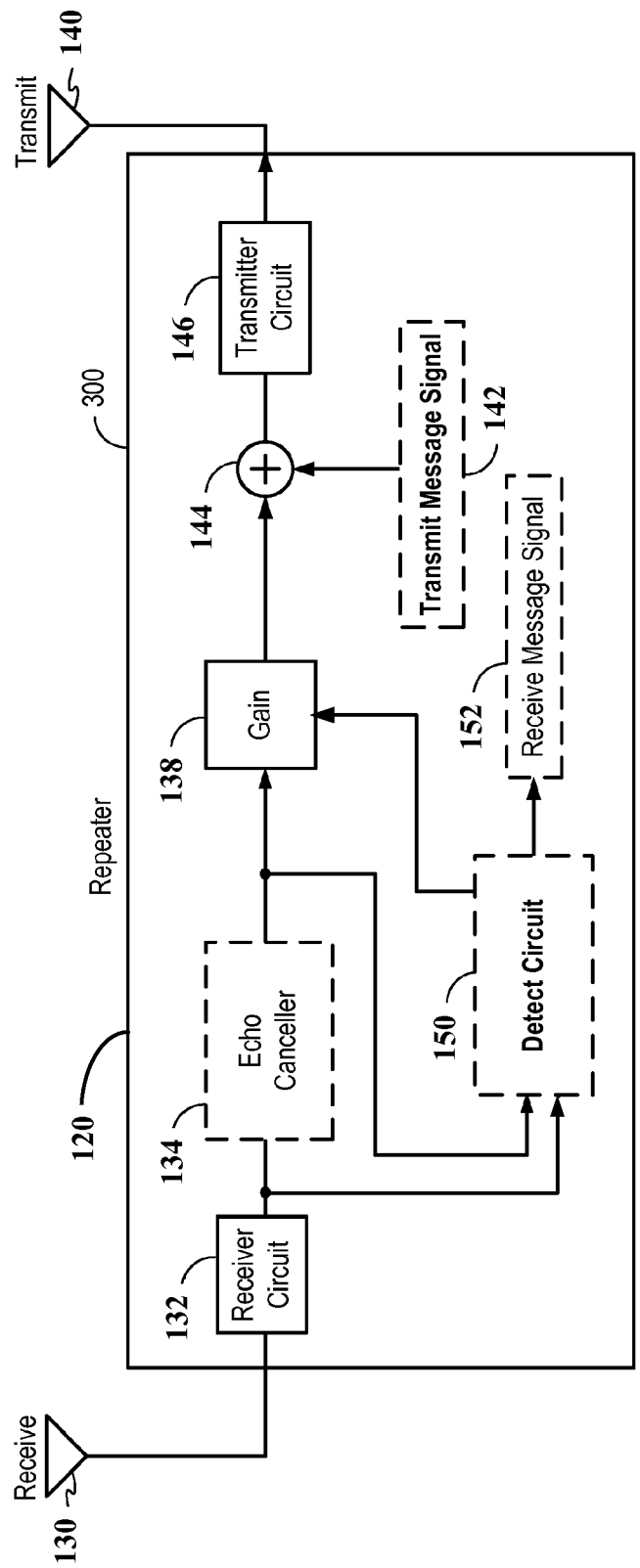
FIG. 1B is a conceptual diagram illustrating a hardware implementation of an apparatus comprising a repeater for a wireless communication system, in accordance with aspects of the disclosure.

FIG. 1B is a conceptual diagram illustrating a hardware implementation of an apparatus 120 comprising a repeater for a wireless communication system, in accordance with aspects of the disclosure. In an implementation, the repeater 120 is configured to receive a signal, amplify the received signal, and transmit the amplified signal. For instance, the repeater 120 receives a signal on a receive antenna 130 through a receive circuit 132. The received signal comprises a remote signal to be repeated and may include a feedback signal resulting from a feedback channel between the receive antenna 130 and the transmit antenna 140 of the repeater 120. In the repeater 120, at least the remote signal component of the received signal is amplified by an amplifier 138 having a gain of G. The amplifier 138 generates an amplified signal to be transmitted from the repeater 120. In various embodiments, the repeater 120 may be implemented with or without echo cancellation. When the repeater 120 comprises echo cancellation, an echo canceller 134 is provided before the amplifier 138 to cancel undesirable feedback signals from the received signal. The repeater 120 may comprise other control circuitry, such as a channel estimation block for estimating the feedback channel and a gain control block for controlling the gain of the amplifier 138. These and various other control circuitry of the repeater 120 may not be shown in FIG. 1B to simplify the discussion; however, it should be understood that the repeater 120 may include one or more other elements and/or components to realize full repeater operation. Note that for a downlink transmission receive antenna 130 would be the donor antenna and transmit antenna 140 would be the coverage antenna, and vice versa for an uplink transmission.

In the repeater 120, before the amplified signal is transmitted via the transmit antenna 140, a message signal 142 may be added to the amplified signally to enable repeater communication. The amplified signal and the transmit message signal may be combined 144 and provided to a transmit circuit 146 to be transmitted via transmit antenna 140. The transmit circuit 146 may include one or more filters and/or driver circuitry. In one implementation, the message signal may comprise a low power spreading sequence and may comprise a power level much less than the power level of the amplified signal. The low power message signal transmitted by the repeater 120 may be referred to herein as a transmit message signal. As shown in FIG. 1B, an adder 144 represents addition of the message signal 142 to the amplified signal. The adder 144 is symbolic only and n actual implementation, appropriate circuitry for combining the low power message signal with the amplified signal may be utilized.

As configured, a transmit signal is generated and comprises a combination of the amplified signal and the transmit message signal 142, and the transmit signal is transmitted over the transmit antenna 140. The inserted message signal may comprise sufficiently low power so that a noise floor introduced is negligible, and the inserted message signal may be approximately 30-40 dB lower than the amplified signal. For instance, when the inserted message signal comprises sufficiently low power, the inserted message signal may be transparent to end-user devices communicating with the repeater 120 and may be shown as noise.

In an implementation, the repeater 120 may comprise a detect circuit 150 configured for detecting power of received signals, detecting changes in power of received signals, and/or adjusting amplification of received signals based on detected changes in power prior to transmitting the signals, for example, by providing a control signal to the amplifier 138. The detect circuit 150 may also be configured for receiving either the echo-cancelled receive signal or the receive signal as an input signal and for processing the input signal to detect and identify any low power message signal that may be provided in the receive signal. The detected message signal 152, which may be referred to as a receive message signal, may be utilized by the repeater 120 to initiate appropriate or desired mitigation strategies. For instance, when the message signal is a low power spreading sequence, techniques familiar to those skilled in the art may be utilized to ensure detection of the low power spreading sequence embedded in the receive signal. The detect circuit 150 of the repeater 300 may be deployed in a multi-repeater environment with other similarly constructed repeaters for facilitating inter-repeater communication. In some instances, the repeater 120 may transmit a message signal, and it may not be necessary for the repeater 120 to detect the message signal from other repeaters. In this instance, the detect circuit 150 is optional and may be omitted. In an implementation, the receiver circuit 132 may be configured to comprise the functionality of the detect circuit 150.

In an implementation, the message signal may encode identification of the repeater 120, operational characteristics of the repeater 120, and/or various other useful information for use by the repeaters in a multi-repeater environment. In an example, the message signal may comprise a low power spreading sequence for identifying the repeater 120. In other examples, the message signal encodes information relating to the operational characteristics of the repeater 120. For example, the message signal may encode the gain level of the repeater 120, or the power level that the repeater 120 receives from other proximate repeaters. The message signal may be configured to encode a value for power amplifier headroom of the repeater 120. Providing power amplifier headroom information in the message signal provides advantages for communicating with an end-user wireless communication device to enable the end-user wireless communication device to transmit signals to the repeater 120 using the appropriate power level. In an implementation, as with the detect circuit 150 and the receive message signal 152, the transmit message signal 142 and the adder 144 are optional and may be omitted, without departing from the scope of the disclosure.

Figure 1C:
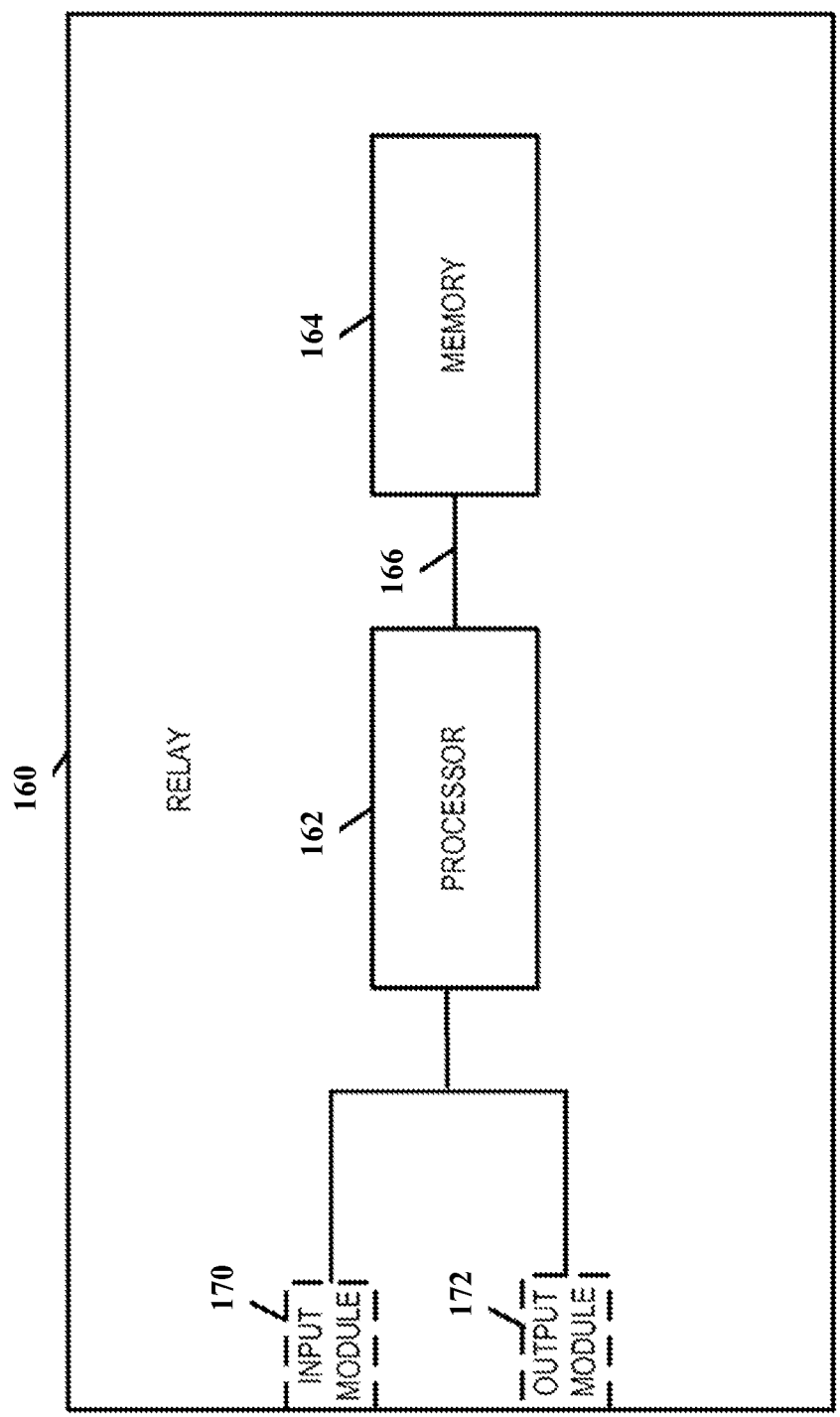
FIG. 1C is a conceptual diagram illustrating a hardware implementation of an apparatus comprising a relay for a wireless communication system, in accordance with aspects of the disclosure.

FIG. 1C is a conceptual diagram illustrating a hardware implementation of an apparatus 160 comprising a relay far a wireless communication system, in accordance with aspects of the disclosure. The relay 160 is configured to receive a signal, decode the received signal, and forward or transmit the decoded signal. In an implementation, the relay 160 includes a processor 162 and memory 164 coupled together via a bus 166 for exchanging data and Information. The relay 160 comprises an input module 170 and an output module 172 coupled to the processor 162 as shown in FIG. 1C. In an implementation, the input module 170 and the output module 172 may be integrated as part of the processor 162. The input module 170 is configured to receive input signals. In an implementation, the input module 170 may comprise a wireless receiver and/or a wired or optical input interface for receiving input. The output module 172 is Configured to provide output signals. In an implementation, the output module 172 may comprise a wireless transmitter and/or a wired or optical output interface for transmitting output.

Figure 2:
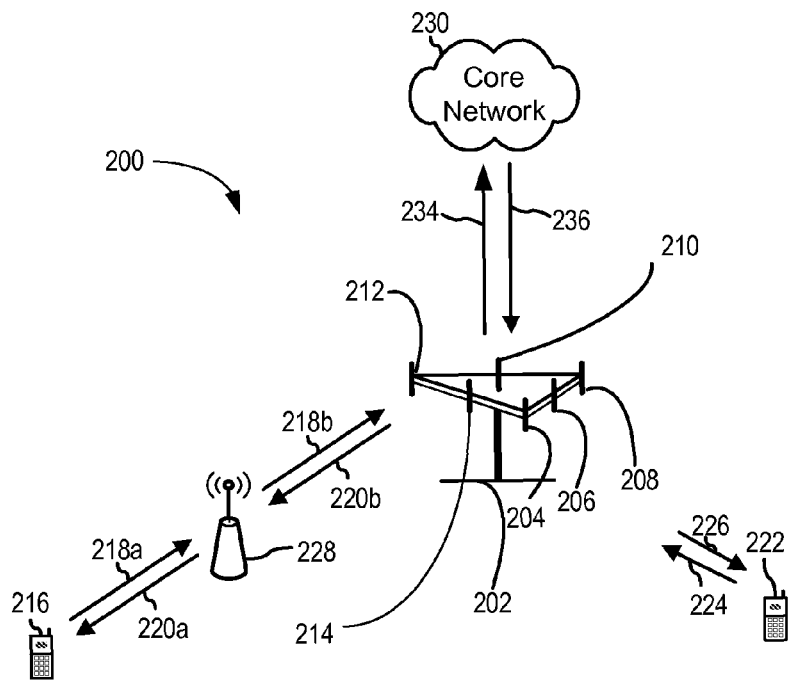
FIG. 2 illustrates a multiple-access wireless communication system, in accordance with aspects of the disclosure.

FIG. 2 is a diagram illustrating an example of a wireless communication system 200, in accordance with aspects of the disclosure. In an implementation, the wireless communication system 200 comprises a multiple access wireless communication system. The wireless communication system 200 may comprise one or more user equipment, (UE) devices 216, 222, at least one repeater (R) device 228, at least one base station device (BS) 202, and at least one core network (CN) 230.

The BS 202 comprises, in an implementation, an access point (AP) comprising multiple antenna groups, for example, one antenna group including antennas 204 and 206, another antenna group including antennas 208 and 210, and another antenna group including antennas 212 and 214. Referring to FIG. 2, even though two antennas are shown for each antenna group, more or fewer antennas may be utilized for each antenna group without departing from the scope of the disclosure.

The UE 216 comprises, in an implementation, an access terminal (AT) that is in communication with any one of the antennas 212, 214, wherein at least one of the antennas 212, 214 transmit information to the UE 216 over forward link or downlink (DL) 220*a*, 220*b* via the repeater 228 and receive information from the UE 216 over reverse link or uplink (UL) 218*a*, 218*b* via the repeater 228. The repeater 228 comprises, in an implementation, a communication device configured to receive a signal, amplify the received signal, and transmit the amplified signal in a manner consistent with the functionality of a repeater. Alternatively, in another implementation, the repeater 228 may comprise a relay communication device that is operable to receive a signal, decode the received signal, and forward or transmit the decoded signal in a manner consistent with the functionality of a relay.

The UE 222 comprises, in an implementation, an AT in communication with any one of the antennas 206 and 208, wherein at least one of the antennas 206 and 208 transmit information to the UE 222 over forward link or downlink (DL) 226 and receive information from the UE 222 over reverse link or uplink (UL) 224.

In an aspect of the disclosure, in a frequency division duplexing (FDD) system, communication links 218*a*, 218*b*, 220*a*, 220*b*, 224 and 226 may utilize different frequencies for communication. For example, forward link or DL 220*a*, 220*b* may utilize a different frequency then that utilized by reverse link or UL 218*a*, 218*b*.

In an aspect of the disclosure, each antenna group and/or the area in which they are configured to communicate may be referred to as a sector of the base station. In an example, each antenna group may be configured to communicate with any UE that is within a sector of the areas covered by the base station.

In an aspect of the disclosure, when communicating over forward links or DLs 220*a*, 220*b*, 226, the transmitting antennas of the BS 202 may utilize beamforming to improve a signal-to-noise ratio of the forward links or DLs 220*a*, 220*b*, 226 for the different UEs 216, 222, respectively. For instance, a base station, such as the BS 202, utilizing beamforming to transmit to UEs, such as UEs 216, 222, scattered randomly through its coverage may cause less interference to the UEs in neighboring cells than a base station transmitting through a single antenna to all its UEs.

In accordance with aspects of the disclosure, a base station may be a fixed station utilized for communicating with user equipment and may also be referred to as an access point (AP), a Node B (NB), evolved Node B (eNodeB or eNB), or some other terminology. A UE may be referred to as an access terminal (AT), a wireless communication device, terminal, or some other terminology. Moreover, a base station may be a macrocell access point, femtocell access point, picocell access point, and/or the like. The repeater or relay may be configured as a base station or user equipment.

In various embodiments, as described herein, one or more segments or one or more extension carriers may be linked to a regular carrier resulting in a composite bandwidth over which the user equipment may transmit information to, and/or receive information from the base station.

In an aspect of the disclosure, the BS 202 is configured to communicate with the core network (CN) 230 via one or more communication paths, such as, for example, an uplink (UL) 234 and/or a downlink (DL) 236. The CN 230 may comprise part of a communication network that provides various services to users connected by the wireless communication system 200. The CN 230 may refer to communication facilities that provide various paths for exchange of information between various sub-networks via a mesh topology. The CN 230 may be referred to as a backbone network.

The various concepts presented throughout this disclosure may be implemented across a broad variety of telecommunication systems, network architectures, and communication standards.

Figure 3A:
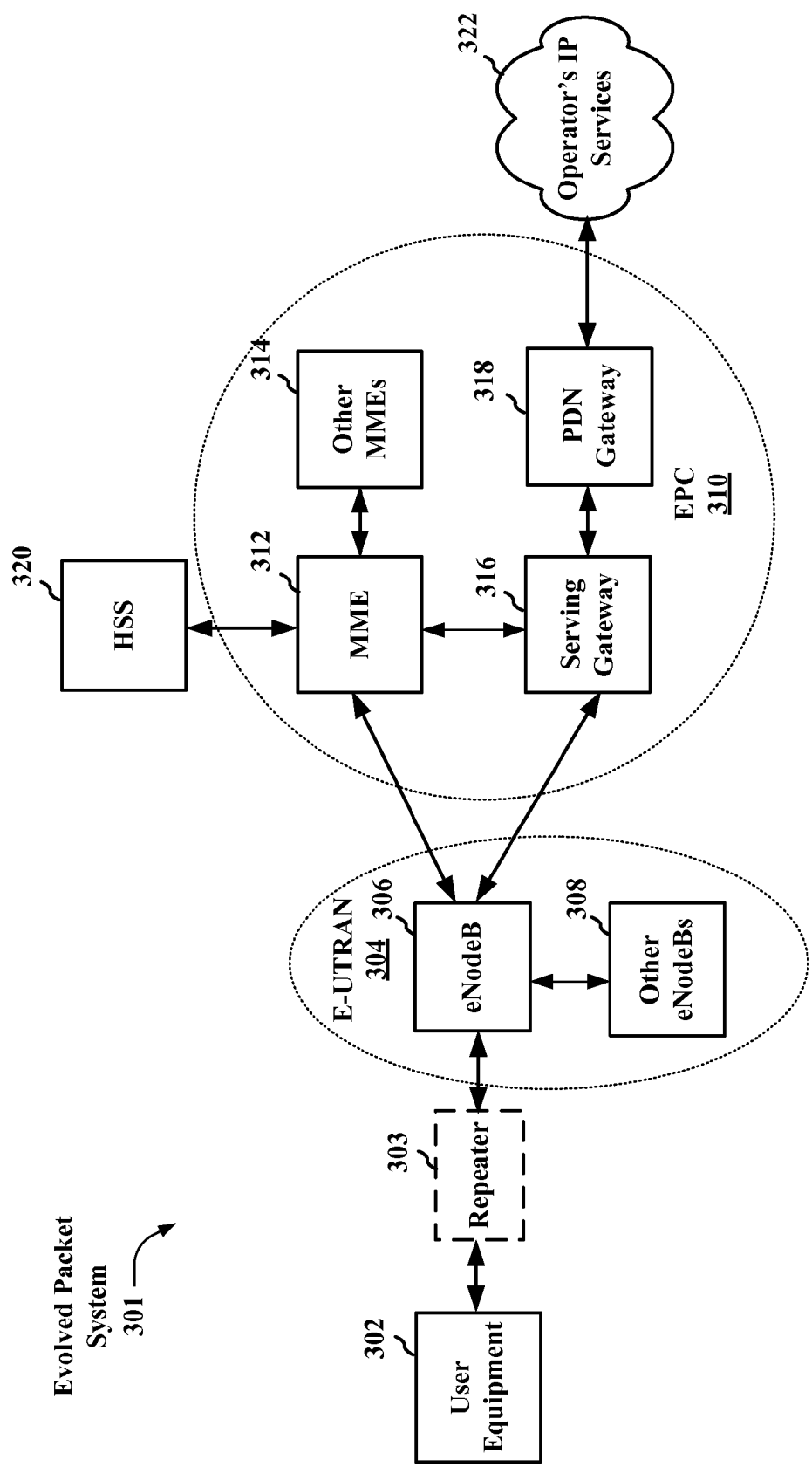
FIGS. 3A-3B are diagrams illustrating various examples of network architectures, in accordance with aspects of the disclosure.

In accordance with aspects of the disclosure, FIG. 3A is a diagram illustrating a network architecture 301 employing various apparatuses (e.g., one or more of apparatuses 100, 120, 160 of FIGS. 1A-1C). In an implementation, the network architecture 301 may comprise an LTE network architecture and may be referred to as an Evolved Packet System (EPS) 300. The EPS 301 comprises one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS 301 may be configured to interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services.

In an implementation, the EPS 301 may include a repeater 303 to achieve coverage extension. The use of one or more repeaters, such as the repeater 303, may increase in the context of personal or residential coverage-extension. In an example, the repeater 303 may comprise a low cost physical layer device, operable to amplify received signals, including usable signals as well as noise and interference, as the repeater 303 may not decode data. The repeater 303 state may not be communicated to either the eNodeB 306 of the E-UTRAN 304 or the UE 302. In one operational aspect, where the repeater 303 is at its maximum output power but the UE 302 output power is not at a maximum, then any UE 302 power increases may result in saturating the repeater 303. A repeated signal received at the E-UTRAN 304 may not to be decodable and may cause the E-UTRAN 304 to request the UE 302 raise its power even further.

In an implementation, the repeater 303 is configured to receive signals, amplify the received signals, and transmit the amplified signals. By contrast, a relay may be operable to receive signals, decode the received signals, and forward or transmit the decoded signals. Thus, in another the repeater 303 may be replaced with a relay to perform similar operations in a manner consistent with the functionality of a relay, without departing from the scope of the disclosure.

In some implementations, repeater performance may be bounded by or dependent on one or more parameters, such as, for example, a maximum amplification (gain) $A_{max}$ and a maximum output power $p_{max}^{rptr}$. Further, the repeater may be operable to use dynamic gain control and may adjust signal amplification to maximize gain given the above parametric constraints. As such, the determination of gain A(n) at a time index n, may be computed as the ratio of maximum output power to current input power, bounded by maximum gain as shown in equation (1).

$$A(n) = \min\left(A_{max}, \frac{P_{max}^{rpir}}{P_{rx}^{rpir}(n)}\right) \quad (1)$$

Where the received power at the repeater is denoted $P_{rx}^{rptr}(n)$. Further, output power of the repeater may be a result of the amplification of the received power, such as shown in equation (2).

$$p_{tx}^{rptr}(n) = \min(P_{max}^{rptr}, A(n)P_{rx}^{rptr}(n)) \quad (2)$$

Moreover, determining an amplification factor may take time and thus may be based on receive power before the time the amplification is applied, and the gain may also be adapted to control self-interference impacts.

In an implementation, the E-UTRAN 304 includes the evolved Node B (eNodeB) 306 and other eNodeBs 308. The eNodeB 306 provides user and control plane protocol terminations toward the UE 302. The eNodeB 306 may be connected to the, other eNodeBs 308 via an X2 interface (i.e., backhaul). The eNodeB 306 may also be referred to by those skilled in the art as a base station, a base transceiver station, a radio base station, a radio transceiver, a transceiver function, a basic service set (BSS), an extended service set (ESS), or some other suitable terminology. The eNodeB 306 provides an access point to the EPC 310 for a UE 302. Examples of UEs 302 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 302 may also be referred to by those skilled in the art as a mobile station, a subscriber station, a mobile unit, a subscriber unit, a wireless unit, a remote unit, a mobile-device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 306 is connected by an S1 interface to the EPC 310. The EPC 310 includes a Mobility Management Entity (MME) 312, other MMEs 314, a Serving Gateway 316, and a Packet Data Network (PDN) Gateway 318. The MME 312 is the control node that processes the signaling between the UE 302 and the EPC 310. Generally, the MME 312 provides bearer and connection management. All user IP packets are transferred through the Serving Gateway 316, which itself is connected to the PDN Gateway 318. The PDN Gateway 318 provides UE IP address allocation as well as other functions. The PDN Gateway 318 is connected to the Operator's IP Services 322. The Operator's IP Services 322 include the Internet, the Intranet, an IP Multimedia Subsystem (IMS), and a PS Streaming Service (PSS).

Figure 3B:
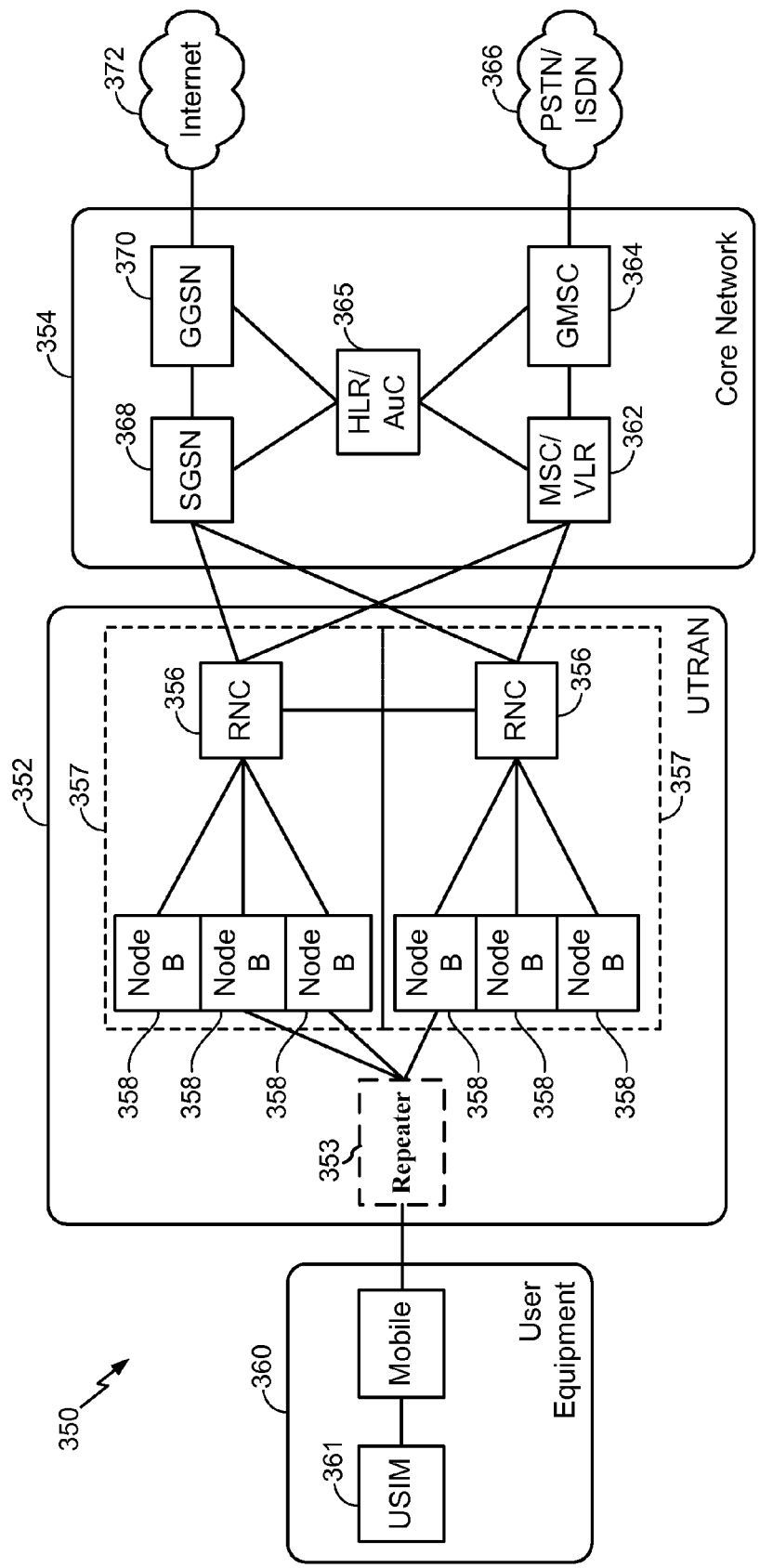

In accordance with aspects of the disclosure, FIG. 3B is a diagram illustrating an UMTS network architecture 350 employing various apparatuses (e.g., one or more of apparatuses 100, 120, 160 of FIGS. 1A-1C). The UMTS network architecture 350 may employ employing a W-CDMA air interface and include at least three interacting domains: a Core Network (CN) 354, a UMTS Terrestrial Radio Access Network (UTRAN) 352, and User Equipment (UE) 360. In this example, the UTRAN 352 provides various wireless services including telephony, video, data, messaging, broadcasts, and/or other services. The UTRAN 352 may include a plurality of Radio Network Subsystems (RNSs) such as an RNS 357, each controlled by a respective Radio Network Controller (RNC) such as an RNC 356. Here, the UTRAN 352 may include any number of RNCs 356 and RNSs 357 in addition to the RNCs 356 and RNSs 357 illustrated herein. The RNC 356 is an apparatus responsible for, among other things, assigning, reconfiguring and releasing radio resources within the RNS 357. The RNC 356 may be interconnected to other RNCs (not shown) in the UTRAN 352 through various types of interfaces such as a direct physical connection, a virtual network, or the like, using any suitable transport network.

Communication between a UE 360 and a Node B 358 may be considered as including a physical (PHY) layer and a medium access control (MAC) layer. Further, communication between a UE 360 and an RNC 356 by way of a respective Node B 358 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

In an implementation, the UTRAN 352 may include a repeater 353 to achieve coverage extension. The use of repeaters, such as the repeater 353, may increase in the context of personal or residential coverage extension. In an example, the repeater 353 may be a low cost physical layer device, operable to amplify received signals, including usable signals as well as noise and interference, as the repeater 353 may not decode data. The repeater 353 state may not be communicated to either the Node B 358 or the UE 360. In an operational example, where the repeater 353 is at its maximum output power but the UE 360 output power is not at a maximum, then any UE 360 power increases may result in saturating the repeater 353. The repeated signal received at the UTRAN 352 may not to be decodable and may cause the UTRAN 352 to request the UE 360 raise its power even further.

The geographic region covered by the RNS 357 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 358 are shown in each RNS 357; however, the RNSs 357 may include any number of wireless Node Bs. The Node Bs 358 provide wireless access points to a CN 354 for any number of mobile apparatuses. Examples of a mobile apparatus include a cellular phone, a smart phone, a session initiation protocol (SIP) phone, a laptop, a notebook, netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 360 may further include a universal subscriber identity module (USIM) 361, which contains a user's subscription information to a network. For illustrative purposes, one UE 360 is shown in communication with a number of the Node Bs 358. The DL, also called the forward link, refers to the communication link from a Node B 358 to a UE 360, and the UL, also called the reverse link, refers to the communication link from a UE 360 to a Node B 358.

The CN 354 interfaces with one or more access network's, such as the UTRAN 352. As shown, the CN 354 is a GSM core network. However, as those skilled in the art will recognize, the various concepts presented throughout this disclosure may be implemented in a RAN, or other suitable access network, to provide UEs with access to types of CNs other than GSM networks.

The CN 354 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 354 supports circuit-switched services with a MSC 362 and a GMSC 364. In some applications, the GMSC 364 may be referred to as a media gateway (MGW). One or more RNCs, such as the RNC 356, may be connected to the MSC 362. The MSC 362 is an apparatus that controls call setup, call routing, and UE mobility functions. The MSC 362 also includes a VLR that contains subscriber-related information for the duration that a UE is in the coverage area of the MSC 362. The GMSC 364 provides a gateway through the MSC 362 for the UE to access a circuit-switched network 366. The GMSC 364 includes a home location register (HLR) 365 comprising subscriber data, such as the data reflecting the details of the services to which a particular user has subscribed. The HLR is also associated with an authentication center (AuC) that contains subscriber-specific authentication data. When a call is received for a particular UE, the GMSC 364 queries the HLR 365 to determine the UE's location and forwards the call to the particular MSC serving that location.

The CN 354 also supports packet-data services with a serving GPRS support node (SGSN) 368 and a gateway GPRS support node (GGSN) 370. GPRS, which stands for General Packet Radio Service, is designed to provide packet-data services at speeds higher than those available with standard circuit-switched data services. The GGSN 370 provides a connection for the UTRAN 352 to packet-based network 372. The packet-based network 372 may be the Internet, a private data network, or some other suitable packet-based network. The primary function of the GGSN 370 is to provide the UEs 360 with packet-based network connectivity. Data packets may be transferred between the GGSN 370 and the UEs 360 through the SGSN 368, which performs primarily the same functions in the packet-based domain as the MSC 362 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 358 and a UE 360. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 360 provides feedback to the node B 358 over the HS-DPCCH to indicate whether it correctly decoded a packet on the downlink.

HS-DPCCH further includes feedback signaling from the UE 360 to assist the node B 358 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 358 and/or the UE 360 may have multiple antennas supporting MIMO technology. The use of MIMO technology enables the node B 358 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 360 to increase the data rate or to multiple UEs 360 to increase the overall system capacity. This is achieved by spatially precoding each data stream and then transmitting each spatially precoded stream through a different transmit antenna on the downlink.

The spatially precoded data streams arrive at the UE(s) 360 with different spatial signatures, which enables each of the UE(s) 360 to recover the one or more the data streams destined for that UE 360. On the uplink, each UE 360 may transmit one or more spatially precoded data streams, which enables the node B 358 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream, beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a singles input to the channel) and multiple receive antennas (multiple outputs from the channel). Thus, in a SIMO system, a single transport block is sent over the respective carrier.

Alternatively, in another implementation, the repeater 353 may be replaced with a relay to perform similar operations in a manner consistent with the functionality of a relay, without departing from the scope of the disclosure. Accordingly, if the relay has upper layers (i.e., a protocol stack), then relay headroom may be communicated to the hosting NodeB/eNodeB so that adverse operating conditions, such as saturation, may be avoided. Referring to the network architecture 350 of FIG. 3B, the relay would take the place of the repeater 353 except that there may or may not be a relay gateway device in the core network 354 (e.g., between the RNC 356 and the SGSN 368 or GGSN 370 or in the packet-based network 372, such as the Internet, a private data network, or some other suitable packet-based network.

Figure 4:
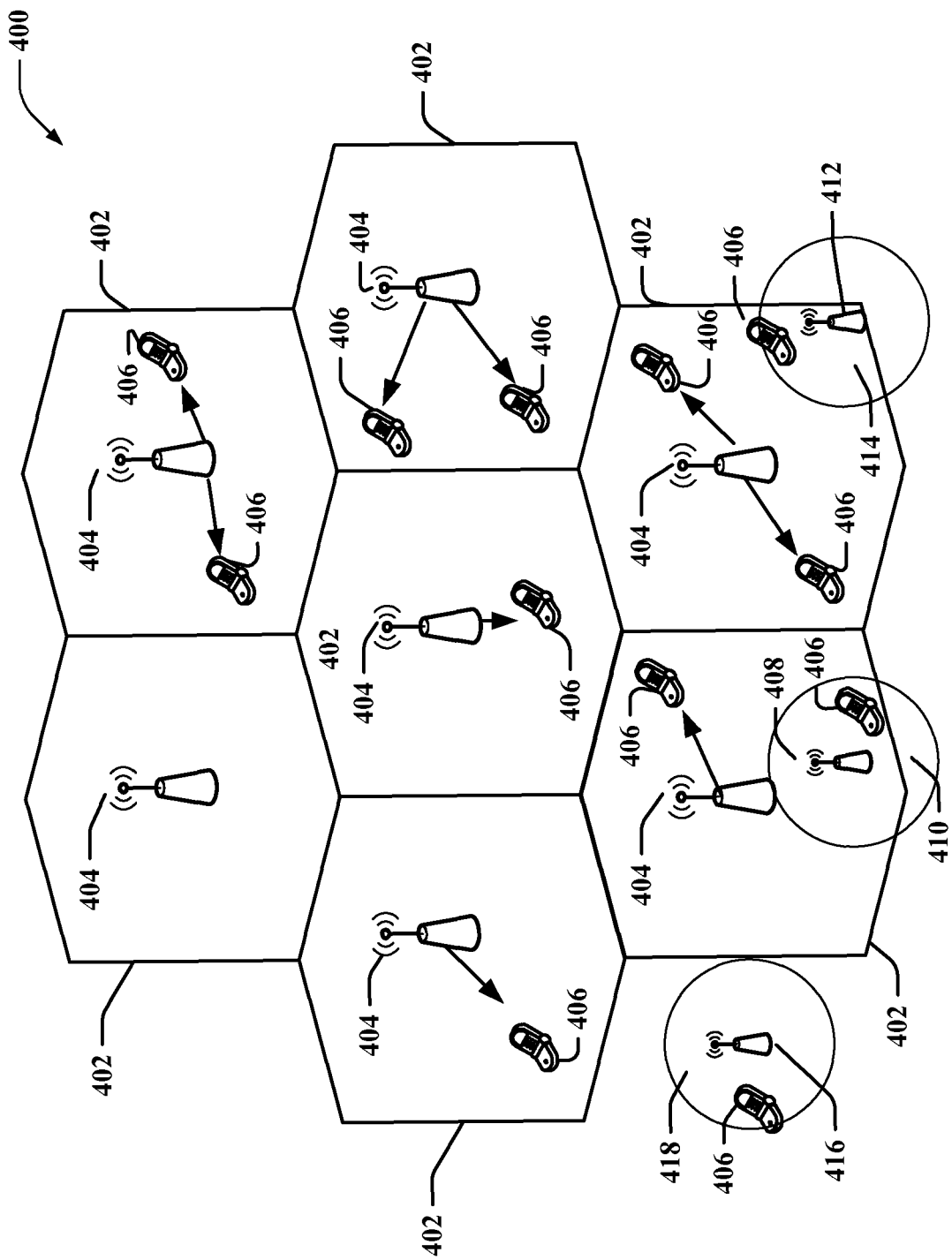
FIG. 4 is a diagram illustrating an example of an access network, in accordance with aspects of the disclosure.

FIG. 4 is a diagram illustrating an example of an access network in an LTE network architecture. In this example, the access network 400 is divided into a number of cellular regions (cells) 402. One or more lower power class eNodeBs 408, 412 may have cellular regions 410, 414, respectively, that overlap with one or more of the cells 402. The lower power class eNodeBs 408, 412 may be femto cells (e.g., home eNodeBs (HeNBs)), pico cells, or micro cells. A higher power class or macro eNodeB 404 is assigned to a cell 402 and is configured to provide an access point to the EPC 310 for all the UEs 406 in the cell 402. There is no centralized controller in this example of an access network 400, but a centralized controller may be used in alternative configurations. The eNodeB 404 is responsible for all radio related functions including radio bearer control, admission control, mobility control, scheduling, security, and connectivity to the serving gateway 316. Additionally, access network 400 may include repeater 416 operable to provide coverage to UE 406 within coverage region 418.

The modulation and multiple access scheme employed by the access network 400 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 404 may have multiple antennas supporting. MIMO technology. The use of MIMO technology enables the eNodeB 404 to exploit the spatial domain to support spatial multiplexing, beamforming, and transmit diversity.

Spatial multiplexing may be used to transmit different streams of data simultaneously on the same frequency. The data steams may be transmitted to a single UE 406 to increase the data rate or to multiple UEs 406 to increase the overall system capacity. This is achieved by spatially precoding each data stream and then transmitting each spatially precoded stream through a different transmit antenna on the downlink. The spatially precoded data streams arrive at the UE(s) 406 with different spatial signatures, which enables each of the UE(s) 406 to recover the one or more of the data streams destined for that UE 406. On the uplink, each UE 406 transmits a spatially precoded data stream, which enables the eNodeB 404 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 5:
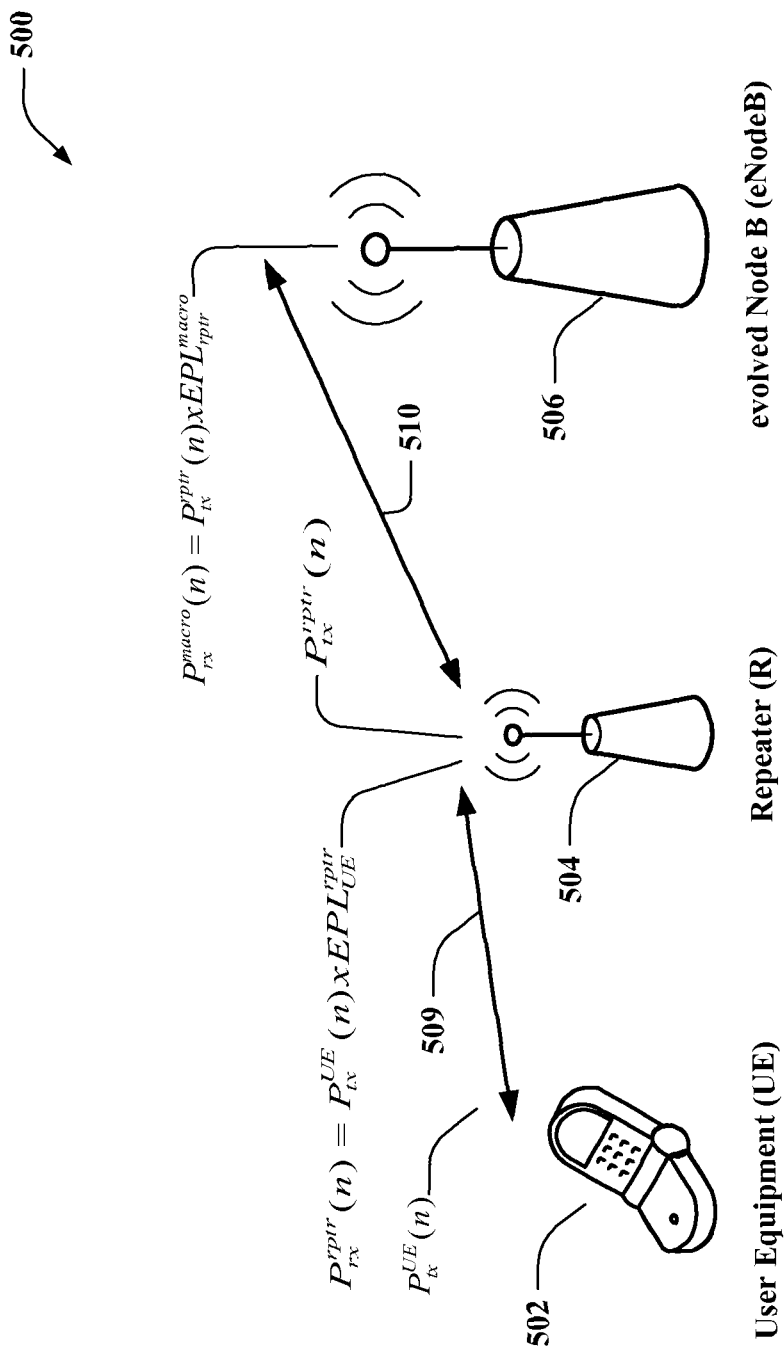
FIG. 5 is a diagram illustrating another example of an access network, in accordance with aspects of the disclosure.

FIG. 5 is a diagram illustrating an example of an access network system 500 using a repeater 504. In an implementation, the repeater 504 may be configured to provide gain that may overcome excessive path loss between an eNodeB 506 and a UE 502. The eNodeB 506 and the UE 502 are utilized as examples, although any cellular system may be substituted. Further, FIG. 5 depicts the relation between transmit and receive powers 509, 510 due to effective path loss (e.g., total of gains and losses) between the eNodeB 506 and the repeater 504 (510) and between the repeater 504 and the UE 502 (508). Generally, the receive power at a node is the product of transmit power at a distant node and an effective path loss (EPL) between them (e.g., transmit power in dBm minus the effective path loss magnitude in the log domain).

In an aspect of the disclosure, due to repeater maximum power constraints, the repeater 504 may be deployed where a repeated signal power may be reliably decoded at the eNodeB 506. In an implementation, this deployment feature may be expressed in terms of a signal to noise ratio at the eNodeB 506 resulting from a maximum repeater transmit power and the effective path loss to the eNodeB 506. As such, the signal-to-noise ratio or interference ratio (SNR) may be sufficiently above what may be achieved by the repeater 504 at maximum power given the effective path loss to the macro and the noise or interference ($N_0$) at the hosting base station, such as shown in equation (3).

$$SNR_{min}^{macro} \geq P_{max}^{rptr} \times EPL_{rptr}^{macro}/N_0 \qquad (3)$$

In an aspect of the disclosure, assuming an SNR around 0 dB is used for high-rate data transmission and thermal noise is at −110 dBm. If the repeater maximum power is 20 dBm, the EPL from the repeater 504 to the eNodeB 506 should be better than −130 dB (e.g., −120 dB). If SNR of −20 dB is used for pilot alone then a maximum limit may be around −150 dB EPL (−130 dB plus −20 dB), but such a weak link may not support any data transmission. As such, at the far end of a feasible relay deployment range (e.g., a highest path loss without being out of range of the eNodeB), the repeater 504 may be at or near maximum output power simply to close the link with the eNodeB 506. In such an operational range, adverse operating conditions, such as saturation, may occur.

In accordance with aspects of the disclosure, an adverse operating condition (e.g., saturation) may arise when a repeater reduces amplification of a user's signal due to limitations on repeater transmit power while a user increases the data being transmitted as instructed by a base station. The base station instructed the user to increase data because the user signaled that it had more transmit power available. However, if the repeater does not have more transmit power available, a problem may arise. An effect of this interaction is that the base station receives the more (or same) data at an equal (or lower) power and thus has difficulty decoding. A base station may respond to such a situation in a number of ways. Since amplification at a repeater may apply to one or more signals being repeated (received), the pilot signal transmitted by the user may decrease as the amplification decreases. Thus, the base station may request the user to increase power. This may, in turn, cause the user to send the same data in retransmissions (e.g., HARQ) at lower power once the user terminal reaches maximum power (due to increasing pilot). Moreover, since decoding may be failing during this time, the base station may increase the set point (target) for received pilot level. A recovery may not occur until the user exhausts the retransmission attempts and is able to reduce the data payload and/or until the user power reaches a maximum user transmit power. At this point, the user may or may not recover (drop the ball) depending on how the set point at the base station has drifted (it may be limited), and how many packet failures have occurred. As such, this chain of events may allow a recovery from adverse operating conditions including saturation (e.g., after packet failures and retransmissions) or may cause connections to fail. In any case, the interference, resource/power usage, and/or disruptions generated by such events are highly undesirable. Therefore, such events may be avoided or at least minimized in magnitude or duration (e.g., recover or terminate as soon as possible).

In accordance with aspects of the disclosure, adverse operating conditions, such as saturation, may refer to a condition in which the repeater 504 is operating in a sufficiently high power range in which a produced signal is sent with insufficient power to be decodable because the transmission power has been limited (i.e., saturated) to a maximum level but nevertheless below a required level. For instance, assuming amplification is unbounded, amplification may be expressed, in equation (4) as a repeater maximum power divided by a received power at the repeater which may be a function of the UE transmit power and effective path loss to the UE.

$$A \cong P_{max}^{rptr}/(P_{tx}^{ue} \times EPL_{ue}^{rptr}) \qquad (4)$$

Further, defining headroom as the amount of power available, the UE power headroom may be defined as the maximum power divided by the headroom factor (HR*) in linear terms, as described in equation (5).

$$P_{tx}^{UE} \leq P_{max}^{UE}/HR^* \qquad (5)$$

Substituting equation (5) into equation (4), it may be shown that there is a relation between amplification and effective path loss on the access link 508 between the UE 502 and the repeater 504. Specifically, for the repeater 504 to be at maximum power and the UE 502 to have non-zero headroom, the amplification may exceed the access link 508 effective path loss by a factor beta (β). Generally, the beta factor may be the product of headroom at the UE and the ratio of repeater maximum power to UE maximum power. If the repeater 504 and the UE 502 have equal maximum powers, that beta factor β is the headroom, as described in equation (6).

$$A \geq \beta_{|dB|} - EPL_{ue[dB]}^{rpir}, \beta \equiv HR^* \frac{P_{max}^{rpir}}{P_{max}^{UE}} \qquad (6)$$

As such, if the effective path loss from the UE 502 to the repeater 504 is relatively low compared to amplification, adverse operating conditions, (e.g., saturation) may become an issue because UE headroom may be greater than repeater headroom. For example, if the EPL is −60 dB and the headroom is 10 dB, if the repeater 504 is at maximum power with amplification at or above 70 dB, then the UE 502 may raise its power, but the repeater 504 cannot. Further, neither the eNodeB 506 nor the UE 502 may be aware that the repeater 504 is at maximum power. As such, if the UE 502 reports available headroom, the eNodeB 506 may grant the UE 502 permission to use that headroom for data transmission. However, that granted headroom may not available at the repeater 504.

In an aspect of the disclosure, adverse operating conditions, such as saturation, may arise when the UE 502 is relatively close to the repeater 504 while the repeater 504 is far from the eNodeB 506. For instance, this range may be provided at a narrow dB region at the eNodeB cell border where repeater deployment may be prevalent as repeaters may be used where coverage is weak. Moreover, personal or residential repeaters may be placed in close proximity to an intended usage location for the UE (e.g., in the same room).

Further, upon detection of adverse operating conditions, the system 500 may react to return to a sustainable state. For example, the system 500 may assume stability before a saturating event occurs (e.g., power control and repeater amplification may be relatively converged and constant). Further, in the stable state, the eNodeB 506 may receive the UEs pilot (overhead) with sufficient power (sufficient signal to noise or interference ratio) while the repeater 504 is at maximum power and the UE 502 has available headroom. Thereafter, if the UE 502 transmits at a significantly high data rate (e.g., raising its output power accordingly), adverse operating conditions including a saturating event may occur. In this example, the UE 502 was transmitting only overhead and then started transmitting high-rate data. However, while this example will be used below, the reasoning applies where the UE 502 increases power for any reason (e.g., transmitting more data/higher payload, etc.).

Continuing the above example, suppose the UE 502 raises its power by a factor alpha ($\alpha$). To avoid adverse operating conditions (e.g., saturation), the repeater 504 amplification may be lowered to meet the maximum power constraint without saturating on the received signal. As such, the repeater 504 may scale back gain by at least the same factor alpha $\alpha$ corresponding to any increase in UE transmit power. For instance, if the UE 502 is transmitting only pilot (overhead) before a saturating event occurs, then alpha ($\alpha$) may correspond to the ratio of the UEs output power once it adds data to the transmission to the UEs output power with only pilot. The new amplification may be a fraction of the old amplification depending on the inverse of the alpha factor, as described in equation (7), wherein n is a time slot or resolvable time instant (e.g., the n'th time instant, where n+1 is the next time slot or instant).

$$A(n+1) = \frac{A(n)}{\alpha(n+1)} \quad (7)$$

However, in operation, the repeater 504 may be a simple physical layer device that receives and amplifies all signals, treating them equally whether they are signal, noise, interference, etc. As such, when the repeater 504 reacts to avoid adverse operating conditions, such as a saturating event, the repeater 504 may reduce the output power of repeated pilot as well as data. Accordingly, the eNodeB 506 may be unable to receive any of these signals. Typically, an inner-loop power control mechanism between the eNodeB 506 and the UE 502 may prompt the eNodeB 506 to command the UE 502 to increase its power when the received pilot signal falls below a target. Moreover, if data decoding fails, an outer-loop power control mechanism may boost (step up) the target for inner-loop power control (adjustment to target denoted as gamma $\gamma$). If the pilot alone is reduced by alpha ($\alpha$), power control may drive up the UEs power by alpha again, as described in equations (8) and (9).

$$P_{tx}^{ue}(n+2) = P_{tx}^{ue}(n+1)\Delta P = \alpha(n+2)P_{tx}^{ue}(n) \quad (8)$$

$$\alpha(n+2) \approx \alpha(n+1)^2 \gamma(n+1) \approx \alpha^2 \quad (9)$$

Accordingly, the UE 502 may ramp up power in reaction to power control compensation for the repeater amplification reduction, until the maximum UE power is reached. But, in the depicted example, as the UE 502 increases its power, the repeater 504 may continue to reduce the amplification. As such, power control at the eNodeB 506 may again drive the UE 502 power up higher. This may continue until the UE 502 cannot raise its pilot power any further or, data is received. Further, one may note that the instability loop described above is driven by the mutually magnifying effects of the repeater amplification reduction to avoid a saturating event and the pilot power control loop, which acts to raise the UEs power to compensate.

Continuing the above example, as the power of the UE increases, less headroom is available for data. Thus, smaller and smaller payloads may be transmitted. However, once the UE 502 reaches maximum power, the pilot power level may be able to stabilize because the repeater 504, and the receive pilot power at the eNodeB 506 may be controlled until it reaches the target. With respect to outer-loop power control, detected packet failures may bump up the target, which may drive the pilot higher, which may further help the reliability in decoding data at the eNodeB 506. For example, power used for data communication may be determined relative to pilot, often expressed as a traffic-to-pilot (T2P) ratio. The T2P ratio may increase as payload increases and may flatten out at higher payloads (e.g., saturating around 10 dB or 12 dB). In other words, less pilot power may be used to coherently decode smaller data packets. As packet sizes increase beyond a certain point, more pilot power may be used. When the UE 502 reaches maximum power, the packet size or transport block size (TBS), may have to be reduced to match available (reduced) headroom.

If the UE 502 power is consequently continually at maximum power, the repeater amplification may not change. Thus, the eNodeB 506 may decode the UE's 502 data. Further, outer-loop power control may consequently adjust the inner-loop target to bring it back down if there was an overshoot due to early packet errors after the initial power increase at the UE 502. For example, the UE 502 may have 10 dB headroom and may increase power by 10 dB to accommodate a large TBS transmission. The repeater 504 may lower amplification by 10 dB to avoid saturation, and inner-loop power control may drive the UE pilot power up by 10 dB resulting in no available headroom for data. Another way to look at it is that, there was not enough effective headroom to begin with at the repeater 504 (e.g., taking into account the saturation effect at the repeater 504).

In summary, saturation based instability may be recovered from faster as the UE 502 becomes closer to maximum power, and consequently, the sooner the UE 502 reaches maximum power. Additionally, a higher data rate may not be achieved even if the UE 502 had more available headroom as the repeater headroom may be a limiting factor. Further, recovery with a higher data rate may occur if the UE 502 is in the region of T2P where less pilot power is used for smaller TBS, wherein T2P is the difference in power between transport (data) and pilot, and TBS is the transport block size, such as how much data, e.g. bits, is in the packet/frame. Moreover, the longer recovery takes, the more likely data transmissions fail, the more the inner-loop set-point may be increased, resulting in more overshoot of a pilot power level.

In an aspect of the disclosure, referring to adverse operating conditions, headroom may be reserved at the repeater 504, wherein such a configuration may result in unused headroom. For instance, it may be waste of resources to reserve any headroom at the repeater 504 if the UE 502 has no available headroom, because the UE 502 may not be able to increase its power for a higher data rate anyway. As such, reserving headroom may merely accomplish limiting repeater deployment potential. In a sense, reserving headroom may limit the maximum repeater power. Similar concerns arise with reserving repeater amplification margin. Limiting amplification may merely limit the repeater's coverage and thus the usability of the repeater 504.

In an aspect of the disclosure, one or more techniques to avoid adverse operating conditions, such as a saturating event may be utilized, wherein such techniques may be implemented, for example, to avoid saturation, avoid instability, accelerate recovery, etc. The techniques described herein allow the repeater 504 to utilize its dynamic range while ensuring reliable operation whether or not adverse operating conditions arise. Further discussion of various response techniques is provided herein with reference to FIG. 7.

In an aspect of the disclosure, one observation is that the bottleneck is the repeater 504. If the repeater 504 is at maximum power, no higher rate may be reached regardless of how much power headroom the UE 502 has. Further, one may note stability may occur when both the UE 502 and the repeater 504 reach maximum power and the link 508 may be closed, when the repeater 504 is at maximum power and the eNodeB 506 and the UE 502 are not attempting to transmit higher data rates, and when the repeater 504 is not at maximum power and amplification is bounded, etc.

In an aspect of the disclosure, recovery may be accelerated by compensating for the mutual magnification effect of repeater amplification reduction and power control or by anticipating it. For instance, the potential for adverse operating conditions may be estimated and pre-compensated for. The earlier the compensation occurs, the more efficiently a response technique may utilized.

Figure 6:
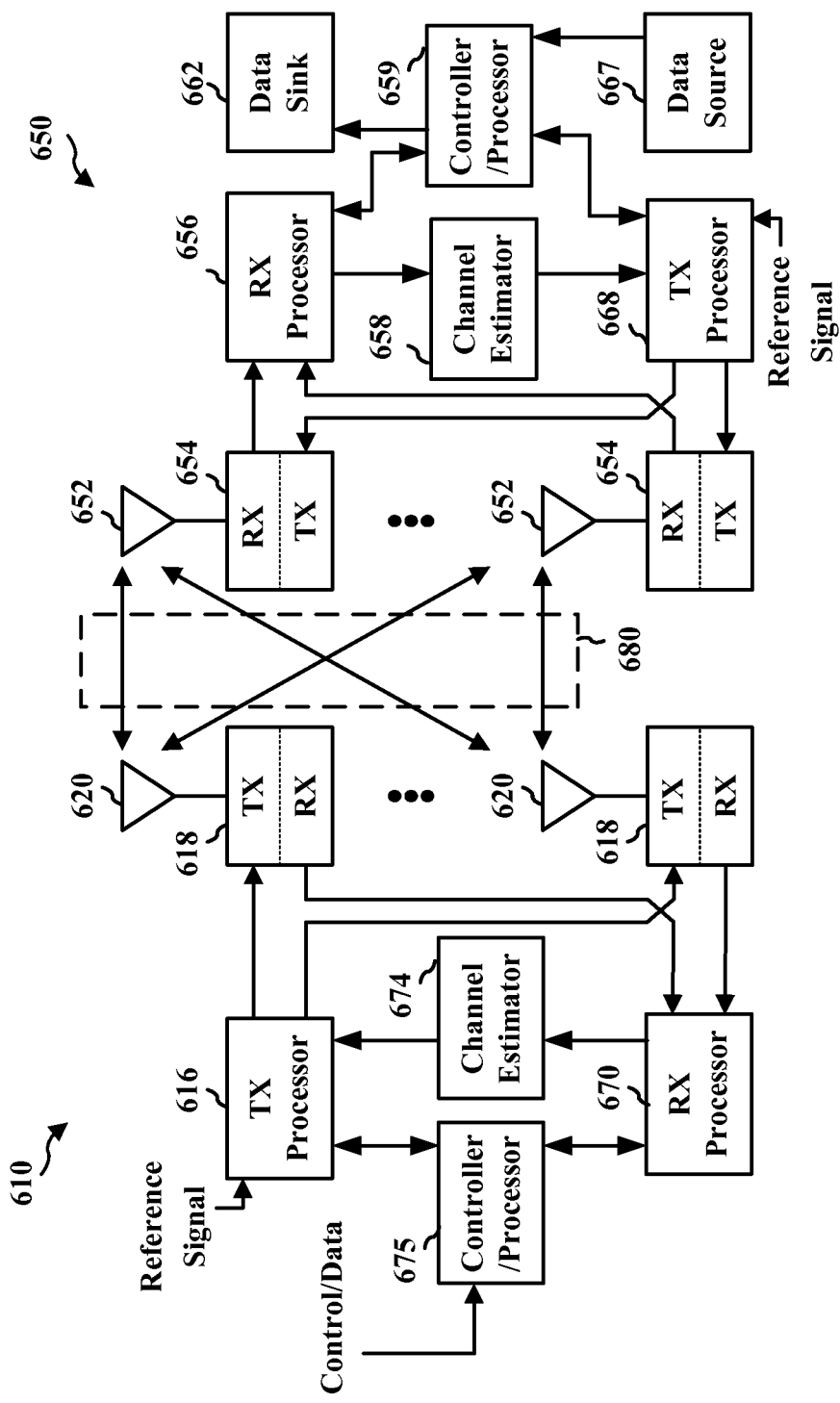
FIG. 6 is a diagram illustrating an example of an evolved Node B and user equipment in an access network, in accordance with aspects of the disclosure.

FIG. 6 is a block diagram of an eNodeB 610 in communication with a UE 650 in an access network. In the downlink (DL), upper layer packets from the core network are provided to a controller/processor 675. The controller/processor 675 implements the functionality of the L2 layer. In the DL, the controller/processor 675 provides one or more of header compression, ciphering, packet segmentation and reordering, multiplexing between logical and transport channels, and radio resource allocations to the UE 650 based on various priority metrics. The controller/processor 675 may also be responsible for one or more of HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier-Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX, Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

As noted above, the controller/processor 659 implements the L2 layer. In the uplink (UL), the controller/processor 659 provides de-multiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (HACK) protocol to support HARQ operations.

In the UL, a data source 667 is used to provide upper layer packets to the controller/processor 659. The data source 667 represents all protocol layers above the L2 layer (L2). Similar to the functionality described in connection with the DL transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1 layer. Further, in accordance with aspects of the disclosure, the antennas (620, 652) may communicate through a repeater 680, in a manner as described herein.

The controller/processor 659 implements an L2 layer. In the UL, the controller/processor 659 provides de-multiplexing between transport and logical, channels, packet reassembly, deciphering, header decompression, control signal processing to recover upper layer packets from the UE 650. Upper layer packets from the controller/processor 675 may be provided to the core network. As previously described herein, the controller/processor 659 may also responsible for error detection using an acknowledgement (ACK) and/or negative acknowledgement (NACK) protocol to support HARQ operations.

Figure 7:
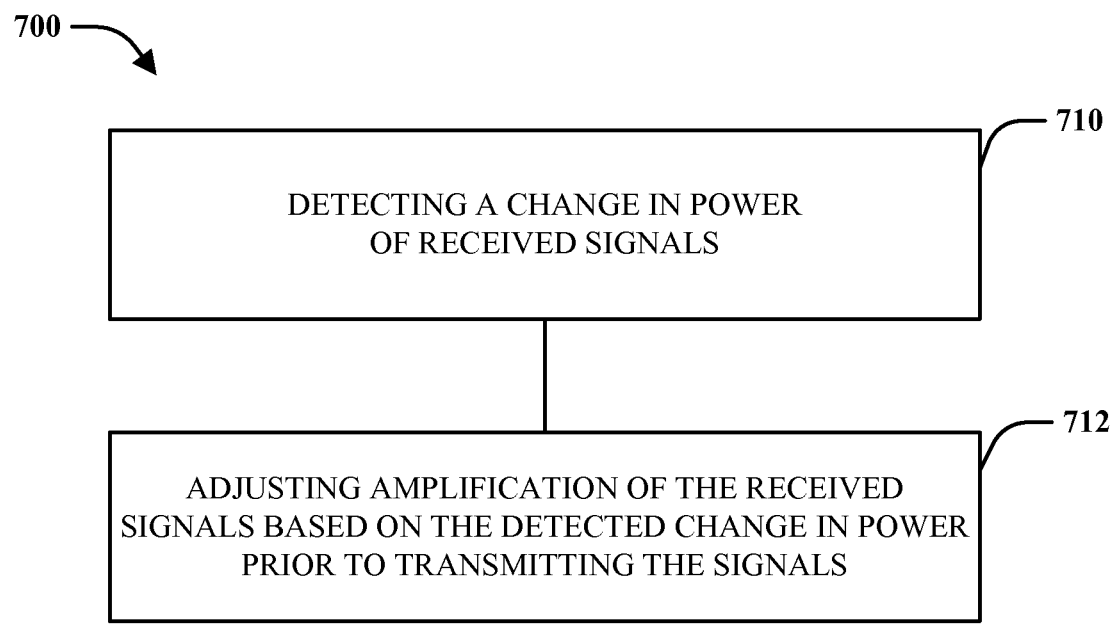
FIG. 7 is a flow diagram of a methodology for wireless communication, in accordance with aspects of the disclosure.

FIG. 7 is a flow diagram 700 of a methodology that facilitates wireless communication, in accordance with aspects of the disclosure. Referring to the flow diagram 700, the method comprises, at 710, detecting a change in power of received signals, and at 712, adjusting amplification of the received signals based on the detected change in power prior to transmitting the signals.

In an aspect of the disclosure, the methodology of FIG. 7 may be utilized by an apparatus, such as a repeater, to detect adverse operating conditions and resolve potential problems that may arise during operation. For instance, the repeater may be configured to utilize all of its dynamic range while ensuring correct operation whether or not adverse operating conditions arise. If the repeater is operating at maximum power, then no higher data rate may be achieved regardless of how much power headroom the UE has available to transmit. In various examples, stability may occur when both the UE and the repeater reach maximum power and the link may be closed, when the repeater is operating at maximum power and the base station and the UE are not attempting to transmit higher data rates, and when the repeater is not operating at maximum power and amplification is bounded. In an implementation, the repeater may be configured to accelerate recovery by anticipating and/or compensating for mutual magnification effect of amplification reduction and power control. As such, the potential for adverse operating conditions, such as a saturating event, may be estimated and pre-compensated for.

In an implementation, referring to FIG. 7, detecting a change in power may comprise detecting an increase in power of received signals, and adjusting amplification of the received signals may comprise reducing amplification of the received signals by an amount of at least greater than the detected change in power.

In an implementation, referring to FIG. 7, detecting a change in power may comprise comparing a detected power level of the received signals to a maximum transmit power level and determining an amount of amplification of the received signals based on the comparison of power levels and adjusting amplification of the received signals may comprise reducing amplification of the received signals by an amount to not exceed a maximum transmit power level.

In an aspect of the disclosure, accelerated recovery may be achieved by reducing amplification more than generally applied in a non-saturating condition, thereby anticipating that the eNodeB may power up the UE further, and further amplification reduction may otherwise be necessary anyway. As such, the repeater may be configured for accelerated reaction upon anticipation of adverse operating conditions.

For instance, in response to anticipating one or more adverse operating conditions indicative of a saturating event, one or more repeater parameters may be modified to obtain additional repeater headroom. For example, in some repeaters not using the current techniques, if the repeater output power is at or near its maximum and the UE increases its power, the repeater may decrease amplification by a standard amplification margin configured to maintain the output power. Using an accelerated reaction technique described herein, the repeater decreases amplification by a saturation avoidance margin that is greater than the standard amplification margin, effectively creating additional repeater headroom rather than maintaining the zero headroom state.

In operation, adverse operating conditions, such as saturation, may be avoided by reducing amplification to avoid saturating at maximum repeater output power. In this instance, the repeater may be configured to subtract a saturation avoidance margin (SAM) from the maximum repeater transmit power value used to compute amplification factor, as described in equation (10).

$$A(n) = \min\left(A_{max}, \frac{P_{max}^{rpir} - \Delta P_{SDM}^{rpir}}{P_{rx}^{rpir}(n)}\right) \quad (10)$$

As a result, amplification may be "over" reduced. The repeater may subtract a saturation avoidance margin (SAM) from the amplification factor directly, as described in equation (11).

$$A(n) = \min\left(A_{max}, \frac{P_{max}^{rpir}}{P_{rx}^{rpir}(n)}\right) - \Delta A_{SDM}^{rpir} \quad (11)$$

Other variations may be for "over" reduction. The margin (SAM) may be adjusted (e.g., increased or decreased) as detection of adverse operating conditions either continues to occur (e.g., be triggered) or stabilizes (e.g., converges).

In an aspect of the disclosure, by over compensating, any consequent UE power increases may have no further increase in repeater output power so that the base station power control loop drives the UE to a stable point faster in the presence of fading, shadowing, etc. By ramping up the UE's power quickly, data loss and set-point increase may be minimized.

In an implementation, referring to FIG. 7, detecting a Change in power may comprise detecting a measure of variation in power of the received signals. The measure of variation in power may define a margin having an upper bound that is used for adjusting amplification of the received signals.

In an implementation, referring to FIG. 7, detecting the measure of variation in power may comprise determining an upper bound for the measure of variation in power of the received signals over a time window, and adjusting amplification may comprise reducing amplification of the received signals to provide a margin for transmit power such that the margin comprises at least the difference between a current transmit power and a transmit power at the upper bound without a decrease in amplification.

In an implementation, referring to FIG. 7, adjusting amplification of the received signals may comprise limiting amplification of the received signals to an upper bound of the measure of variation in power.

In an implementation, referring to FIG. 7, detecting the measure of variation in power may comprise determining a difference between a minimum and a maximum power level of the received signals within a time window.

In an aspect of the disclosure, a relative margin may be achieved by the repeater to avoid adverse operating conditions, such as saturation. For instance, a repeater operating point may have the same amount of headroom as the UE. The repeater may achieve this operating point without directly knowing the UE's headroom. As such, the repeater may maintain an output power variation range coincident with the receive power level variation from the UE. For example, if the UE power is varying by 10 dB (e.g., whether due to fading or data bursts on and off or any other reason) and if the repeater maintains amplification in a 10 dB of output power range, adverse operating conditions, such as saturation, may be avoided. In another instance, if the variation is due to data bursts, the repeater may utilize a margin on the order of the maximum UE traffic-to-pilot (T2P) ratio.

In operation, the repeater may measure the average short-term difference between minimum and maximum received UE transmission power at the repeater, and the repeater may be configured to utilize this value as a margin for its own headroom. In an implementation, the repeater may measure UE receive power and maintain a short-term minimum and/or a short-term maximum of that value. Thereafter, the repeater may determine the difference and then filter the value to obtain a range estimate. For example, the short-term min and max may be defined as follows in equations (12) and (13) over a moving windows of N samples.

$$P_{rx\text{-}min}^{rptr}(n) \cong \min(P_{rx}^{rptr}(n-N,n)) \quad (12a)$$

$$P_{rx\text{-}max}^{rptr}(n) \cong \max(P_{rx}^{rptr}(n-N,n)) \quad (13a)$$

In various aspects of the disclosure, filters may be implemented in various ways. A Finite Impulse Response (FIR) filter comprises, a finite time window. In this sense, the min( ) and max ( ) equations 12 and 13 are considered finite because these equations are limited to the samples measured from time instants n to n–N (i.e., window size N). However, Infinite Impulse Response (IIR) filters may be simpler to implement because less memory is utilized (e.g., only the prior filtered value f and the most recent measured value x, using a constant alpha α which here would be between 0 and 1):

$$f(n) = (1-\alpha)f(n-1) + \alpha x(n)$$

This principle may be applied to the current received power or the maximum or minimum of that power as follows, $$P_{rx\text{-}min}^{rptr}(n) = \min(\alpha P_{rx\text{-}min}^{rptr}(n-1), P_{rx}^{rptr}(n)) \quad (12b)$$

$$P_{rx\text{-}max}^{rptr}(n) = \max(\alpha P_{rx\text{-}max}^{rptr}(n-1), P_{rx}^{rptr}(n)) \quad (13b)$$

Note that in the above, an alpha α value greater than 1 may be used for 12b but less than 1 for 13b, so that if the input (the receive power) is above (in the case of 12b) or below (in the case of 13b) the filter tends to drift higher or lower respectively (toward the current value).

Further, the samples themselves may be filtered to account for fast-fading, wherein this filtering is of the received signal and not the amplification or the transmit power level. In an implementation, filtering of the input receive power level may provide a means for determining the margin. In contrast, amplification may be applied to the actual receive power to obtain actual output power. As such, the actual (applied) amplification may be adjusted or changed to have a relative margin.

The difference between the bounds may be defined for any time index n, such as described in equation (14).

$$\Delta P_{RRM}^{rptr}(n) \cong P_{rx\text{-}max}^{rptr}(n) - P_{rx\text{-}min}^{rptr}(n) \quad (14)$$

Where the different of the bounds may then be filtered as described in equation (15).

$$\Delta \hat{P}_{RRM}^{rptr}(n) \cong c P_{rx\text{-}max}^{rptr}(n) - (1-c)\hat{P}_{rx\text{-}min}^{rptr}(n-1) \quad (15)$$

In operation, if the UE either exceeds the margin by inducing a larger variation at the repeater receiver or by transmitting at a higher power than before, the repeater may increase the margin. The UE's power may then further increase due to the feedback. Thus, the margin may approach the UE's actual headroom. As such, the measured variation or measure of variation may decrease thereby stabilizing the margin adjustment loop. Further, if the UE exceeds the given margin, the increase of the margin may cause the UE to have trouble closing the loop at lower power. This may also drive up the UE power and may resulting in closing variation. Thus, the repeater may then close the margin until the UE recovers the link resulting in a stable situation.

In an aspect of the disclosure, the difference may be utilized to determine an offset to apply from a maximum power level in computing the amplification factor based on a receive power level. For example, while the amplification factor may depend on a receive power level, the amplification factor may be bounded to allow a resulting output power to be offset from the maximum repeater output power. That bound may be determined given the measured difference (or variance) in the incoming signal power from the UE. For instance, when signal power is relatively low compared to its recent history, the amplification may be bounded. Yet, when the signal power is relatively high compared to its recent history, the amplification may be below the bound but result in a repeater output power close to or at maximum output power. Such an amplification bound may be computed, for example, by the amplification of the short-term minimum receive power that may result in a safe repeater output power. A safe output power may be a power level below the maximum repeater output power (assuming variation in the UE input power). Further, the safe repeater output power level may be below the maximum by an amount safe to avoid adverse operating conditions, such as saturation, if the input power increases so that a saturating event is avoided, potentially even if the short-term maximum input power (or even higher) is reached or so that saturation may occur but the subsequent adjustment, in amplification would be small compared to other channel variations.

In an aspect of the disclosure, the repeater may maintain an output power margin based on the difference between the current input power and only the short-term maximum power. For example, the repeater may maintain the transmit power below the maximum by an amount coinciding with the amount by which the power received from the UE is below the short-term maximum of the UE's received power. As such, the amplification may depend on not only the UE received power but also the short-term maximum power statistics of the UE's power. The relative repeater maximum-based margin (RRMM) difference may be described in equation (16).

$$\Delta P_{RRMM}^{rptr}(n) \cong P_{rx\text{-}max}^{rptr}(n) - P_{rx}^{rptr}(n) \quad (16)$$

The margin may be applied by computing the amplification based on replacing the maximum repeater power with a version backed off by the RRMM amount, as described in equation (17).

$$A(n) = \min\left(A_{max}, \frac{P_{max}^{rpir} - \Delta P_{RRMM}^{rpir}}{P_{rx}^{rpir}(n)}\right) \quad (17)$$

In an aspect of the disclosure, margin bounds may not have short term averages. In another aspect of the disclosure, a margin may not be based on a fixed time duration but rather an adapted time duration. A time-frame may be adapted based on variations of fluctuations in receive power level or the sensitivity of the system to variation or the frequency of saturation occurring (e.g., increase the time window of consideration for bounds if saturation occurs more frequently). In an aspect of the disclosure, probability of saturation may be determined as the frequency of saturation occurring (e.g., when using the prior value of amplification would have resulted in output power exceeding the maximum). Using such a metric, the time window for margin adjustment may be extended by an amount when the estimated probability of saturation exceeds a desired target and increased otherwise.

In an aspect of the disclosure, input power may refer to input power due to one particular mobile. However, this may be generalized as it does not matter whether the input power is due to one UE or multiple UEs or even noise or interference or combinations thereof. In operation, as the repeater may amplify all received inputs the amplification may apply to the ratio of total transmit power to total receive power level. In an implementation, if the UE that is increasing its power (one UE among many) is less dominant in terms of its receive signal power at the repeater than another UE, then the amplification reduction will be less impacted by that UE so the instability effect may be dampened.

Additionally, while a region in which saturation may occur is around a limit of coverage for the eNodeB, there is a subtle distinction to make, that is, the coverage limit may depend on the data rate. In other words, the coverage limit may generally shrink as data rate increases. Thus saturation can occur for a repeater closer to the eNodeB (lower path loss) for a higher data rate transmission.

In an implementation, referring to FIG. 7, adjusting amplification of the received signals may comprise limiting amplification of the received signals to a maximum power threshold for transmitting signals.

In an implementation, referring to FIG. 7, adjusting amplification of the received signals may comprise increasing a measures of backoff as the power of the received signals approaches the maximum power threshold and reducing amplification of the received signals by the measure of backoff.

In an aspect of the disclosure, conditional amplification may be achieved by the repeater to avoid adverse operating conditions, such as saturation. For instance, adverse operating conditions, such as saturation, may arise when amplification is high and the repeater is near or at maximum power. Thus, there is motivation to limit amplification as a function of how close the repeater is operating to maximum. Further, amplification may not otherwise be limited. For instance, controlling amplification may depend on the magnitude of the amplification or the headroom of the repeater. If a nominal amplification A(n) is defined as an amplification factor that would otherwise be applied, a controlled amplification may be defined as a function of that nominal amplification and the difference between the repeater's maximum power $P_{max}^{rptr}$ and the expected power $P_{tx}^{rptr}$ that would result if the nominal amplification was applied as described in equation 18 (e.g., $A(n)P_{rx}^{rptr}$ assuming the repeater's maximum power is already taken into account in regards to computing the nominal amplification A(n)).

$$\hat{A}(n) = f(A(n), P_{max}^{rptr}/P_{tx}^{rptr}) \quad (18)$$

Where $f$ is A function and $\hat{A}(n)$ may be the controlled (adjusted) amplification. For example, the function may be defined to adjust the amplification as follows: as the difference gets smaller (repeater transmit power closer to maximum), the magnitude of adjustment (backoff) may be increased, as described in equation (19).

$$f(A, \Delta P) = \frac{c_0 A}{1 - c_1 \Delta P} \quad (19)$$

This new amplification may also be bounded by the maximum amplification. Further, the output of the function may be bounded by $A_{max}$ (e.g., amplification may also be lower bounded). Still further, the coefficients may be determined such that a desired safe amplification $A_0$ is achieved when power would otherwise be at the maximum, such as described in equation (20).

$$c_0 = A_0/A_{max} \quad (20)$$

And, such that no adjustment is achieved $\hat{A}=A$ when the power level is at a desired safe power level $P_{safe}^{rptr}$ (sufficiently far from maximum power), $c_1$ may be described in equation 21.

$$c_1 = (1-c_0)/(P_{max}^{rptr}/P_{safe}^{rptr}) \quad (21)$$

In one operational aspect, a repeater may have a maximum power level of 20 dBm and may have 10 dB of headroom. Then, $P_{safe}^{rptr}$ may be set to 10 dBm. Further, suppose that 60 dB of amplification is considered safe given the intended repeater deployment. Then, $A_0$ may be set to 60 dB. As a result, the coefficients may be determined accordingly.

In accordance with aspects of the disclosure, the methodology of FIG. 7 may be utilized by an apparatus, such as a repeater, to detect adverse operating conditions and resolve potential problems that may arise during operation. As such, any or all of the techniques described in reference to the methodology of FIG. 7 may be utilized by the repeater in various combinations to avoid adverse operating conditions.

Figure 8:
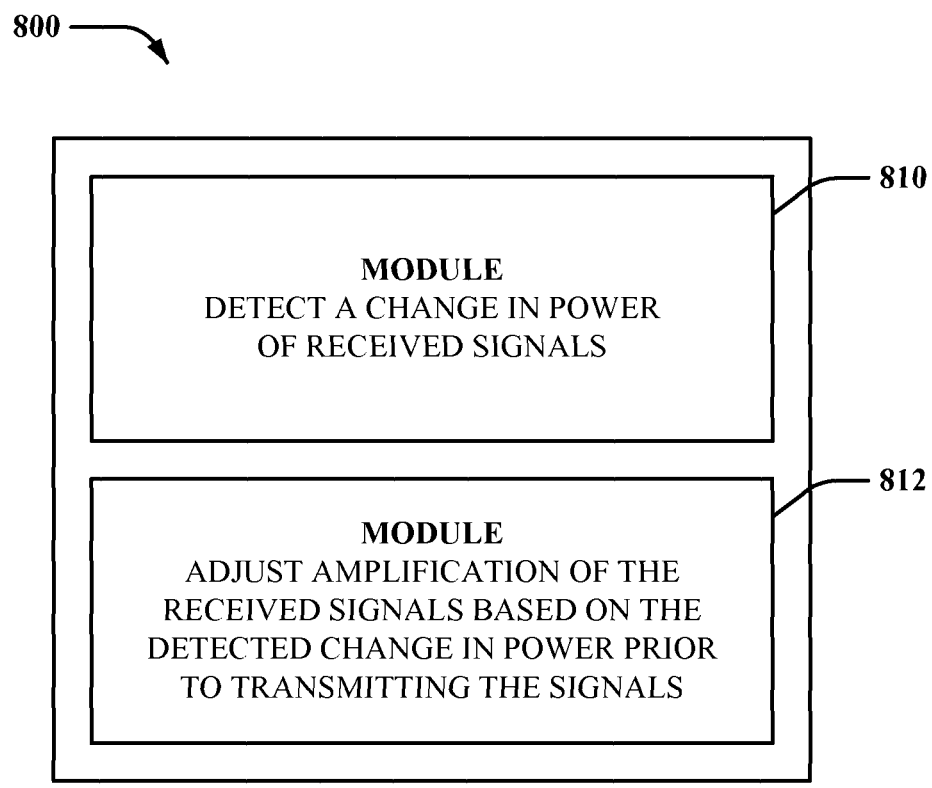
FIG. 8 is a conceptual block diagram illustrating the functionality of an exemplary apparatus, in accordance with aspects of the disclosure.

FIG. 8 is a conceptual block diagram 800 illustrating functionality of an apparatus, such as a repeater, configured to facilitate wireless communication. The apparatus includes a module 810 configured to detect a change in power of received signals. The apparatus includes a module 812 configured to adjust amplification of the received signals based on the detected change in power prior to transmitting the signals. The apparatus may include additional modules that perform each of the steps in the aforementioned flow charts. As such, each step in the aforementioned flow charts may be performed by a module and the apparatus may include one or more of those modules.

In one configuration, the apparatus for wireless communication is configured for accelerated reaction, wherein detecting the change in power may comprise detecting an increase in power of the received signals, and adjusting amplification of the received signals may comprise reducing amplification of the received signals by an amount of at least greater than the detected change in power. In an implementation, detecting the change in power may comprise comparing a detected power level of the received signals to a maximum transmit power level and determining an amount of amplification of the received signals based on the comparison of power levels. In another implementation, adjusting amplification of the received signals may comprise reducing amplification of the received signals by an amount to not exceed a maximum transmit power level.

In a configuration, the apparatus for wireless communication is configured for a relative margin, wherein detecting the change in power may comprise detecting a measure of variation in power of the received signals. In an implementation, the measure of variation in power may define a margin having an upper bound that is used for adjusting amplification of the received signals. In an implementation, detecting the measure of variation in power may comprise determining an upper bound for the measure of variation in power of the received signals over a time window, wherein adjusting amplification comprises reducing amplification of the received signals to provide a margin for transmit power such that the margin comprises at least the difference between a current transmit power and a transmit power at the upper bound without a decrease in amplification. In an implementation, adjusting amplification of the received signals may comprise limiting amplification of the received signals to an upper bound of the measure of variation in power. In an implementation, detecting the measure of variation in power may comprise determining a difference between a minimum and a maximum power level of the received signals within a time window.

In a configuration, the apparatus for wireless communication is configured for conditional amplification. In an implementation, adjusting amplification of the received signals may comprise limiting amplification of the received signals to a maximum power threshold for transmitting signals. In an implementation, adjusting amplification of the received signals may comprise increasing a measure of backoff as the power of the received signals approaches the maximum power threshold and reducing amplification of the received signals by the measure of backoff.

Referring to FIG. 1A, in a configuration, the apparatus for wireless communication comprises the apparatus 100 comprising the processing system 114 to provide a means for detecting a change in power of received signals and a means for adjusting amplification of the received signals based on the detected change in power prior to transmitting the signals.

Referring to FIG. 1B, in a configuration, the apparatus for wireless communication comprises the repeater 120 comprising the receiver circuit 132 and/or the detect circuit 150 to provide a means for detecting a change in power of received signals and a means for adjusting amplification of the received signals based on the detected change in power prior to transmitting the signals. In an implementation, the receiver circuit 132 may be configured to comprise the functionality of the detect circuit 150.

Referring to FIG. 1C, in a configuration, the apparatus for wireless communication comprises the relay 160 comprising the processor 162 to provide a means for detecting a change in power of received signals and a means for adjusting amplification of the received signals based on the detected change in power prior to transmitting the signals.

It will be appreciated that, in accordance with one or more aspects described herein, inferences may be made regarding or for performing the functions described herein. As utilized herein, the term to "infer" or "inference" refers generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event data sources.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality a microprocessors, one or more microprocessors in conjunction with DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited utilizing the phrase "means for" or, in the case of a method claim, the element is recited utilizing the phrase "step for."

What is claimed is:

1. A method for wireless communication, comprising:
   detecting a change in power of received signals by comparing a detected power level of the received signals to a maximum transmit power level; and
   adjusting amplification of the received signals based, in part, on the detected change in power and on a measure of backoff relative to a maximum power threshold for transmitting signals prior to transmitting amplified signals, wherein the amplification of the received signals is adjusted by reducing the amplification of the received signals by an amount so as to not exceed the maximum power threshold for transmitting signals, wherein the maximum power threshold for transmitting signals is less than the maximum transmit power level.

2. The method of claim 1, wherein detecting the change in power comprises detecting an increase in power of the received signals.

3. The method of claim 2, wherein adjusting amplification of the received signals comprises reducing amplification of the received signals by an amount at least greater than the detected change in power.

4. The method of claim 1, wherein detecting the change in power comprises determining an amount of amplification of the received signals based further, in part, on the comparison of power levels.

5. The method of claim 1, wherein detecting the change in power comprises obtaining a measure of variation in power of the received signals.

6. The method of claim 5, wherein the measure of variation in power defines a margin having an upper bound that is used for adjusting amplification of the received signals.

7. The method of claim 5, wherein adjusting amplification of the received signals comprises limiting amplification of the received signals to an upper bound of the measure of variation in power.

8. The method of claim 5, wherein detecting the measure of variation in power comprises determining a difference between a minimum and a maximum power level of the received signals within a time window.

9. The method of claim 1, wherein adjusting amplification of the received signals comprises limiting amplification of the received signals based, in part, on the maximum power threshold for transmitting signals.

10. A method for wireless communication, comprising:
    detecting a measure of variation in power of received signals, wherein detecting comprises determining an upper bound for the measure of variation in power of the received signals over a time window; and
    adjusting amplification of the received signals based on the measured variation in power prior to transmitting amplified signals, wherein adjusting amplification comprises reducing amplification of the received signals to provide a margin for transmit power such that the margin comprises at least a difference between a current transmit power and a transmit power at the upper bound without a decrease in amplification.

11. A method for wireless communication, comprising:
    detecting a change in power of received signals; and
    adjusting amplification of the received signals based on the detected change in power prior to transmitting amplified signals, wherein adjusting amplification comprises limiting amplification of the received signals to a maximum power threshold, in part, by:
    increasing a measure of backoff as the power of the received signals approaches the maximum power threshold; and
    reducing amplification of the received signals by the measure of backoff.

12. An apparatus for wireless communication, comprising:
    a transceiver to receive signals, and
    a processing system coupled to the transceiver, wherein the processing system is configured to:
    detect a change in power of received signals received by the transceiver by comparing a detected power level of the received signals to a maximum transmit power level; and
    adjust amplification of the received signals based, in part, on the detected change in power prior and on a measure of backoff relative to a maximum power threshold for transmitting signals prior to transmitting amplified signals, wherein adjusting amplification comprises reducing the amplification of the received signals by an amount so as to not exceed the maximum power threshold for transmitting signals, wherein the maximum power threshold for transmitting signals is less than the maximum transmit power level.

13. The apparatus of claim 12, wherein to detect the change in power, the processor is configured to detect an increase in power of the received signals.

14. The apparatus of claim 13, wherein to adjust amplification of the received signals, the processing system is configured to reduce amplification of the received signals by an amount at least greater than the detected change in power.

15. The apparatus of claim 12, wherein to detect the change in power, the processing system is configured to determine an amount of amplification of the received signals based further, in part, on the comparison of power levels.

16. The apparatus of claim 12, wherein to detect the change in power, the processing system is configured to obtain a measure of variation in power of the received signals.

17. The apparatus of claim 16, wherein the measure of variation in power defines a margin having an upper bound that is used for adjusting amplification of the received signals.

18. The apparatus of claim 16, wherein to adjust amplification of the received signals, the processor is configured to limit amplification of the received signals to an upper bound of the measure of variation in power.

19. The apparatus of claim 16, wherein to detect the measure of variation in power, the processor is configured to determine a difference between a minimum and a maximum power level of the received signals within a time window.

20. The apparatus of claim 12, wherein to adjust amplification of the received signals, the processor is configured to limit amplification of the received signals based, in part, on the maximum power threshold for transmitting signals.

21. An apparatus for wireless communication, comprising:
    a processing system configured to:
    detect a measure of variation in power of received signals, wherein detecting comprises determining an upper bound for the measure of variation in power of the received signals over a time window; and
    adjust amplification of the received signals based on the measured variation in power prior to transmitting amplified signals, wherein adjusting amplification comprises reducing amplification of the received signals to provide a margin for transmit power such that the margin comprises at least a difference between a current transmit power and a transmit power at the upper bound without a decrease in amplification.

22. An apparatus for wireless communication, comprising:
a processing system configured to:
- detect a change in power of received signals; and
- adjust amplification of the received signals based on the detected change in power prior to transmitting amplified signals, wherein adjusting amplification comprises limiting amplification of the received signals to a maximum power threshold for transmitting signals, in part, by:
- increasing a measure of backoff as the power of the received signals approaches the maximum power threshold; and
- reducing amplification of the received signals by the measure of backoff.

23. An apparatus for wireless communication, comprising:
means for detecting a change in power of received signals by comparing a detected power level of the received signals to a maximum transmit power level; and
means for adjusting amplification of the received signals based, in part, on the detected change in power and on a measure of backoff relative to a maximum power threshold for transmitting signals prior to transmitting amplified signals, wherein the means for adjusting amplification comprises means for reducing the amplification of the received signals by an amount so as to not exceed the maximum power threshold for transmitting signals, wherein the maximum power threshold for transmitting signals is less than the maximum transmit power level.

24. The apparatus of claim 23, wherein the means for detecting the change in power comprises means for detecting an increase in power of the received signals.

25. The apparatus of claim 24, wherein the means for adjusting amplification of the received signals comprises means for reducing amplification of the received signals by an amount at least greater than the detected change in power.

26. The apparatus of claim 23, wherein the means for detecting the change in power comprises means for determining an amount of amplification of the received signals based further, in part, on the comparison of power levels.

27. The apparatus of claim 23, wherein the means for detecting the change in power comprises means for obtaining a measure of variation in power of the received signals.

28. The apparatus of claim 27, wherein the measure of variation in power defines a margin having an upper bound that is used for adjusting amplification of the received signals.

29. The apparatus of claim 27, wherein the means for adjusting amplification of the received signals comprises means for limiting amplification of the received signals to an upper bound of the measure of variation in power.

30. The apparatus of claim 27, wherein the means for detecting the measure of variation in power comprises means for determining a difference between a minimum and a maximum power level of the received signals within a time window.

31. The apparatus of claim 23, wherein the means for adjusting amplification of the received signals comprises means for limiting amplification of the received signals based, in part, on the maximum power threshold for transmitting signals.

32. An apparatus for wireless communication, comprising:
means for detecting a measure of variation in power of received signals, wherein the means for detecting comprises means for determining an upper bound for the measure of variation in power of the received signals over a time window; and
means for adjusting amplification of the received signals based on the measured variation in power prior to transmitting amplified signals, wherein the means for adjusting amplification comprises means for reducing amplification of the received signals to provide a margin for transmit power such that the margin comprises at least a difference between a current transmit power and a transmit power at the upper bound without a decrease in amplification.

33. An apparatus for wireless communication, comprising:
means for detecting a change in power of received signals; and
means for adjusting amplification of the received signals prior to transmitting amplified signals by limiting amplification of the received signals based, in part, on a maximum power threshold for transmitting signals, wherein the means for adjusting comprises:
means for increasing a measure of backoff as the power of the received signals approaches the maximum power threshold; and
means for reducing amplification of the received signals by the measure of backoff.

34. A computer program product, comprising:
a computer-readable medium embodying program code, which when executed by a processor on a repeater apparatus, performs a method comprising:
- detecting a change in power of received signals; and
- adjusting amplification of the received signals based, in part, on the detected change in power and on a measure of backoff relative to a maximum power threshold for transmitting signals prior to transmitting amplified signals.

35. The computer program product of claim 34, wherein detecting the change in power comprises detecting an increase in power of the received signals.

36. The computer program product of claim 35, wherein adjusting amplification of the received signals comprises reducing amplification of the received signals by an amount at least greater than the detected change in power.

37. The computer program product of claim 34, wherein detecting the change in power comprises determining an amount of amplification of the received signals based further, in part, on the comparison of power levels.

38. The computer program product of claim 34, wherein detecting the change in power comprises obtaining a measure of variation in power of the received signals.

39. The computer program product of claim 38, wherein the measure of variation in power defines a margin having an upper bound that is used for adjusting amplification of the received signals.

40. The computer program product of claim 38, wherein adjusting amplification of the received signals comprises limiting amplification of the received signals to an upper bound of the measure of variation in power.

41. The computer program product of claim 38, wherein detecting the measure of variation in power comprises determining a difference between a minimum and a maximum power level of the received signals within a time window.

42. The computer program product of claim 34, wherein adjusting amplification of the received signals comprises limiting amplification of the received signals based, in part, on the maximum power threshold for transmitting signals.

43. A computer program product comprising a computer-readable medium embodying program code, which when executed by a processor performs a method for wireless communication, the method comprising:
detecting a measure of variation in power of received signals, wherein detecting comprises determining an upper bound for the measure of variation in power of the received signals over a time window; and adjusting amplification of the received signals based on the measured variation in power prior to transmitting amplified signals, wherein adjusting amplification comprises reducing amplification of the received signals to provide a margin for transmit power such that the margin comprises at least a difference between a current transmit power and a transmit power at the upper bound without a decrease in amplification.

44. A computer program product comprising a computer-readable medium embodying program code, which when executed by a processor, performs a method for wireless communication, the method comprising:

detecting a change in power of received signals; and adjusting amplification of the received signals prior to transmitting amplified signals by limiting amplification of the received signals based, in part, on a maximum power threshold for transmitting signals, wherein adjusting amplification comprises:

increasing a measure of backoff as the power of the received signals approaches the maximum power threshold; and reducing amplification of the received signals by the measure of backoff.

* * * * *